Feb. 1, 1927.
R. T. NEWTON
1,616,327
STABILIZER
Filed Sept. 25, 1920
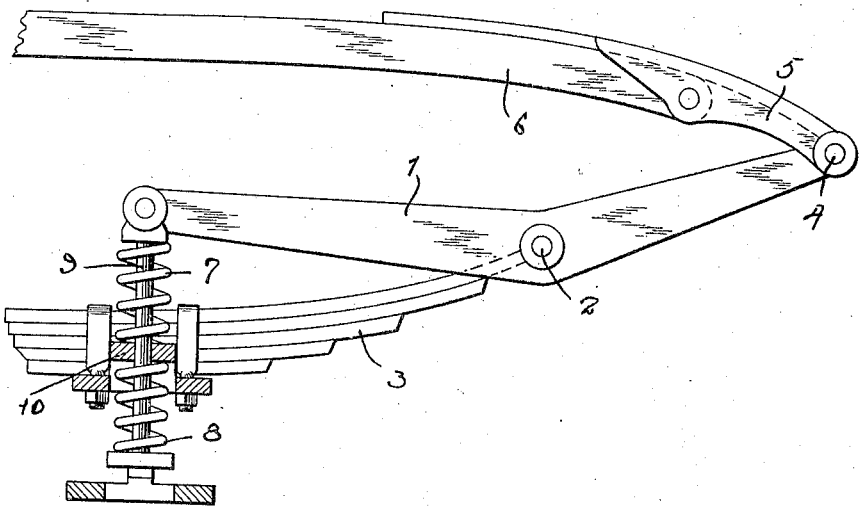
Inventor
RICHARD T. NEWTON
By his Attorneys Patented Feb. 1, 1927.

1,616,327

UNITED STATES PATENT OFFICE.

RICHARD T. NEWTON, OF NEW YORK, N. Y.

STABILIZER.

Application filed September 25, 1920. Serial No. 412,716.

My invention relates to stabilizers, and particularly to a device for automobiles, the object of my invention being to provide means for maintaining the body of the car free from shocks and jolts to which the running gear of the car is subjected when passing over rough roads.

In the accompanying drawing, I have shown in side elevation a stabilizer in which my invention is embodied in one form.

In an endeavor to secure an easy and smooth riding chassis in automobile construction, various shock eliminator devices have been proposed, the underlying thought of which is to interpose cushioning springs between the main supporting spring and the rigid chassis. The thrusts of the main spring under heavy stress, incident to encounter with an obstruction or depression in the road, are thus transmitted less violently to the chassis.

Another class of devices for the same purpose, is the so-called "snubber" which interposes a friction device between the chassis and running gear so as to retard the motion of the chassis with respect thereto, thus to prevent the chassis from following the vertical fluctuations of the running gear to the full extent permitted, or occasioned, by the main supporting spring. Both classes of devices are designed to interpose a spring or friction cushion between the chassis and axle. In both classes, the chassis is permitted to follow the vertical fluctuations of the running gear, though to a modified extent.

There is a further class of devices commonly called equalizers, in which through lever systems of one type or another, the motion of one portion of the chassis, or body of the vehicle, is tranmitted to another portion thereof. These connections are either across the vehicle from one side to the other, or longitudinally from front to rear, and the object and action thereof is to equalize the up and down motion of the chassis laterally or longitudinally, but without opposing or modifying the usual cushioning action of the springs or preventing the chassis from following the undulations of the running gear through the supporting springs.

The present invention differs from all these types of cushioning devices by imparting to the chassis a positive movement in a direction opposite to that of the running gear. Thus, instead of cushioning the drop of the chasss following the drop of the running gear, the chassis is, on the contrary, positively lifted upward, and vice versa. The result of this action is that after depression, for example, of the running gear in a road rut, it rises to normal position with less opposition than would be the case were the supporting springs deflected by the drop of the chassis theron following the drop of the running gear, and this is true even though the drop of the chassis be cushioned by such a shock eliminator as above mentioned. In view of the fact that the springs are not heavily compressed, there is less tendency to rebound—and this phenomenon it is most desirable to eliminate since the worst tossing of the chassis is caused by the rebound following a heavy depression of the main supporting springs. The action is of course independent at each corner of the vehicle, and the present device, which I call a "stabilizer" or counter-action device, is interposed between the running gear and chassis in the neighborhood of the axle, in such a manner that its action depends solely upon the relative vertical displacement of the running gear and chassis at said point of connection.

It may be pointed out that inasmuch as the operation of the present device is dependent upon the relative vertical movement of the chassis and running gear, some flexible connection between the latter is essential. This connection may be of any suitable sort, the usual supporting spring being serviceable for this purpose. It is clear, however, that the action of the present device is in no way dependent upon this spring, save in so far as it permits relative vertical motion between the chassis and the running gear between which the present stabilizer is interposed. It may be noted further that the action of the present device is positively in opposition to the yielding connection. That is to say, instead of permitting the chassis to follow the motion of the running gear with cushioned movement, it thrusts the chassis in a direction opposite to that imparted to the running gear by the inequalities of the roadway. In other words, when the wheel drops into a rut, thus momentarily relieving the spring from portion of the chassis weight, the present counteraction device further relieves the spring by lifting the chassis through the downward movement of the running gear; and vice versa, when the wheel rises over an obstruction, thus stressing the spring further, the present counteraction device positively increases this stress by depressing the chassis. So far as known, this is a radical departure from customary practice in chassis control.

In the construction shown I employ a lever 1, pivoted intermediate its ends at 2 to one end of the main spring 3. At one end the lever is pivoted at 4 to a bracket 5 rigid with, and secured in extension of the chassis side bar 6. The opposite end of the lever is connected through strain relief springs 7 and 8 and pin 9 with the running gear 10.

By this construction the upward thrust of the axle 10 pulls down the chassis 6 through the lever 1. Vice versa, on the fall of the axle the lever serves to raise the chassis.

Various other constructions by which analogous action is secured will readily occur to those dealing with the problem. The underlying thought of the invention is to impart a positive motion in opposite directions to the running gear and chassis under the conditions stated, providing where necessary or advisable, a strain relief spring or its equivalent to prevent injury to the stabilizer device from sudden and possibly excessive strains to which it is likely to be subjected.

I claim as my invention—

1. In a vehicle, a body chassis having rigid side bars, running gear comprising an axle extending transversely of the chassis, a leaf spring secured to the axle and interposed between the same and the chassis side bar, said leaf spring lying substantially in the plane of said side bar, in combination with a lever of the first class fulcrumed at the end of the leaf spring and having one arm flexibly connected to the side bar, and its other arm extending to a point substantially in the vertical plane of the axle, and means connecting said end of the lever and the axle to cause said lever end to move in both directions with the axle.

2. In a vehicle, a body chassis having rigid side bars, running gear comprising an axle extending transversely of the chassis, a leaf spring secured to the axle and interposed between the same and the chassis side bar, said leaf spring lying substantially in the plane of said side bar, in combination with a lever of the first class fulcrumed at the end of the leaf spring and having one arm flexibly connected to the side bar, and its other arm extending to a point substantially in the vertical plane of the axle, and cushioned means connecting said end of the lever and the axle to cause said lever end to move in both directions with the axle.

3. In a vehicle, a body chassis having rigid side bars, running gear comprising an axle extending transversely of the chassis, a leaf spring secured to the axle and interposed between the same and the chassis side bar, said leaf spring lying substantially in the plane of said side bar, in combination with a lever of the first class fulcrumed at the end of the leaf spring and having one arm flexibly connected to the side bar, and its other arm extending to a point substantially in the vertical plane of the axle, and compression spring means between said end of the lever and the axle to cause said lever end to move in both directions with the axle.

In testimony whereof I have signed my name to this specification.

RICHARD T. NEWTON.